(12) United States Patent
Beus et al.

(10) Patent No.: US 6,272,954 B1
(45) Date of Patent: Aug. 14, 2001

(54) APPARATUS FOR MACHINING EXPLOSIVE MATERIALS

(75) Inventors: Ray Beus, Willard; Robert Hatch, Wellsville, both of UT (US); Steven Nicolich, Wyckoff; Donald Geiss, Jr., Wharton, both of NJ (US)

(73) Assignee: Cordant Technologies Inc., Salt Lake City, UT (US)

( * ) Notice: Subject to any disclaimer, the term of this patent is extended or adjusted under 35 U.S.C. 154(b) by 0 days.

(21) Appl. No.: 09/440,883

(22) Filed: Nov. 16, 1999

Related U.S. Application Data

(60) Provisional application No. 60/108,864, filed on Nov. 17, 1998.

(51) Int. Cl.[7] .................................................. B23B 3/00
(52) U.S. Cl. ............................... 82/117; 82/152; 82/162; 82/173
(58) Field of Search .............................. 82/117, 152, 162, 82/163, 173, 901, 115

(56) References Cited

U.S. PATENT DOCUMENTS

| | | |
|---|---|---|
| 2,585,113 | 2/1952 | Gredell . |
| 2,748,578 | 6/1956 | Potts . |
| 3,404,557 | 10/1968 | Hecht et al. . |
| 3,858,987 | 1/1975 | Kleinhans et al. . |
| 4,034,633 | * 7/1977 | Petersen ................................. 82/152 |
| 4,514,936 | * 5/1985 | Hurtado ................................. 51/270 |
| 5,131,941 | * 7/1992 | Lemelson ........................... 75/10.19 |
| 5,613,453 | * 3/1997 | Donovan ............................. 72/56 X |
| 5,728,967 | * 3/1998 | Parkes ................................. 102/303 |
| 5,992,276 | * 11/1999 | Sullivan ................................. 82/112 |

* cited by examiner

*Primary Examiner*—Henry Tsai
(74) *Attorney, Agent, or Firm*—Sullivan Law Group

(57) ABSTRACT

Apparatus for machining workpiece made of an explosive material, the apparatus including: a drive system and a cutting tool assembly for cutting a workpiece made of an explosive material; an elongate member carried by, and projecting along an axis from, the drive system for holding the workpiece at a machining location while being rotated about the axis by the drive system; and a first shield element interposed between the machining location and the drive system for protecting the drive system against damage in the event of explosion of the workpiece.

24 Claims, 3 Drawing Sheets

APPARATUS FOR MACHINING EXPLOSIVE MATERIALS

This application claims the benefit of U.S. Provisional Application No. 60/108,864, filed Nov. 17, 1998.

STATEMENT REGARDING FEDERALLY SPONSORED RESEARCH OR DEVELOPMENT

The invention was made by, or under contract with, an agency of the U.S. Government, specifically, the U.S. Department of the Army (Picatinny Arsenal)/DAAE 30-97-C-1040.

BACKGROUND OF THE INVENTION

The present invention relates to the machining of explosive materials.

In a number of industrial and scientific fields, it is necessary to machine explosive materials, such as those employed for weapon warheads and rocket propellants. In the course of development of a new explosive material, it is necessary to machine the material in a laboratory setting in order to determine whether the material can be safely machined in an industrial manufacturing facility. In accordance with standard safety practices, such experimental machining is carried out under automated or remote control in an enclosure from which personnel are evacuated prior to a machining operation so that there will be no danger of injury or fatalities.

However, the experimental machining apparatus itself is of necessity in proximity to the material being machined and will be subject to destruction, or at least costly damage, in the event of an explosion.

BRIEF SUMMARY OF THE INVENTION

It is an object of the present invention to prevent or minimize damage to machining apparatus in the event of explosion of material being machined.

A more specific object of the invention is to prevent physical damage to the machining equipment due to explosion shock waves.

Another specific object of the invention is to prevent the machining apparatus from experiencing damage caused by dust resulting from an explosion of material being worked on.

The above and other objects are achieved, according to the present invention, by an apparatus for machining workpiece made of an explosive material, the apparatus comprising: a drive system and a cutting tool assembly for cutting a workpiece made of an explosive material; an elongate member carried by, and projecting along an axis from, the drive system for holding the workpiece at a machining location while being rotated about the axis by said drive system; and a first shield element interposed between the machining location and the drive system for protecting the drive system against damage in the event of explosion of the workpiece.

DETAILED DESCRIPTION OF THE INVENTION

Figure 1:
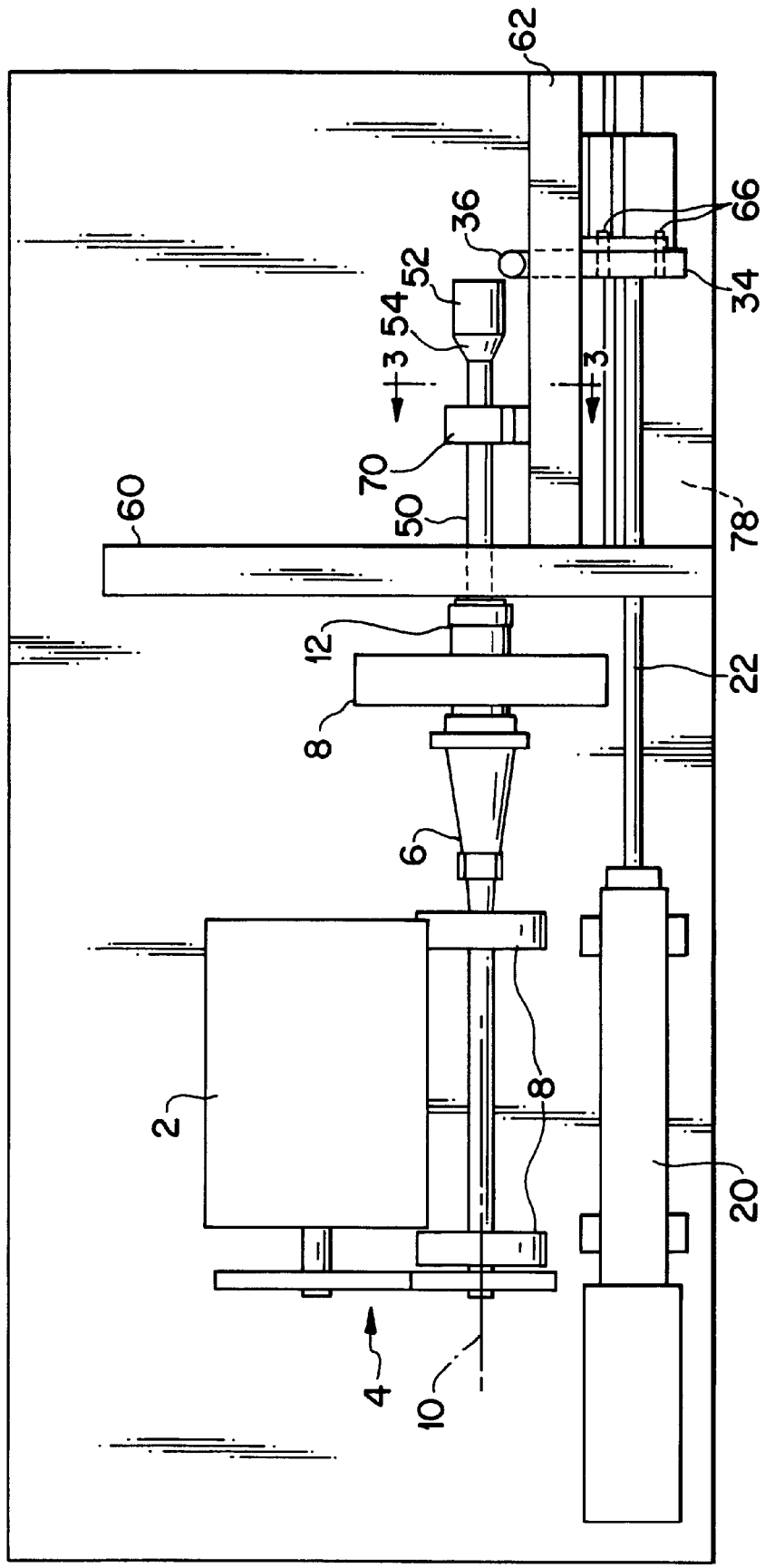
FIG. 1 is a top plan view of one preferred embodiment of apparatus according to the present invention, with several cover components removed.
Figure 2:
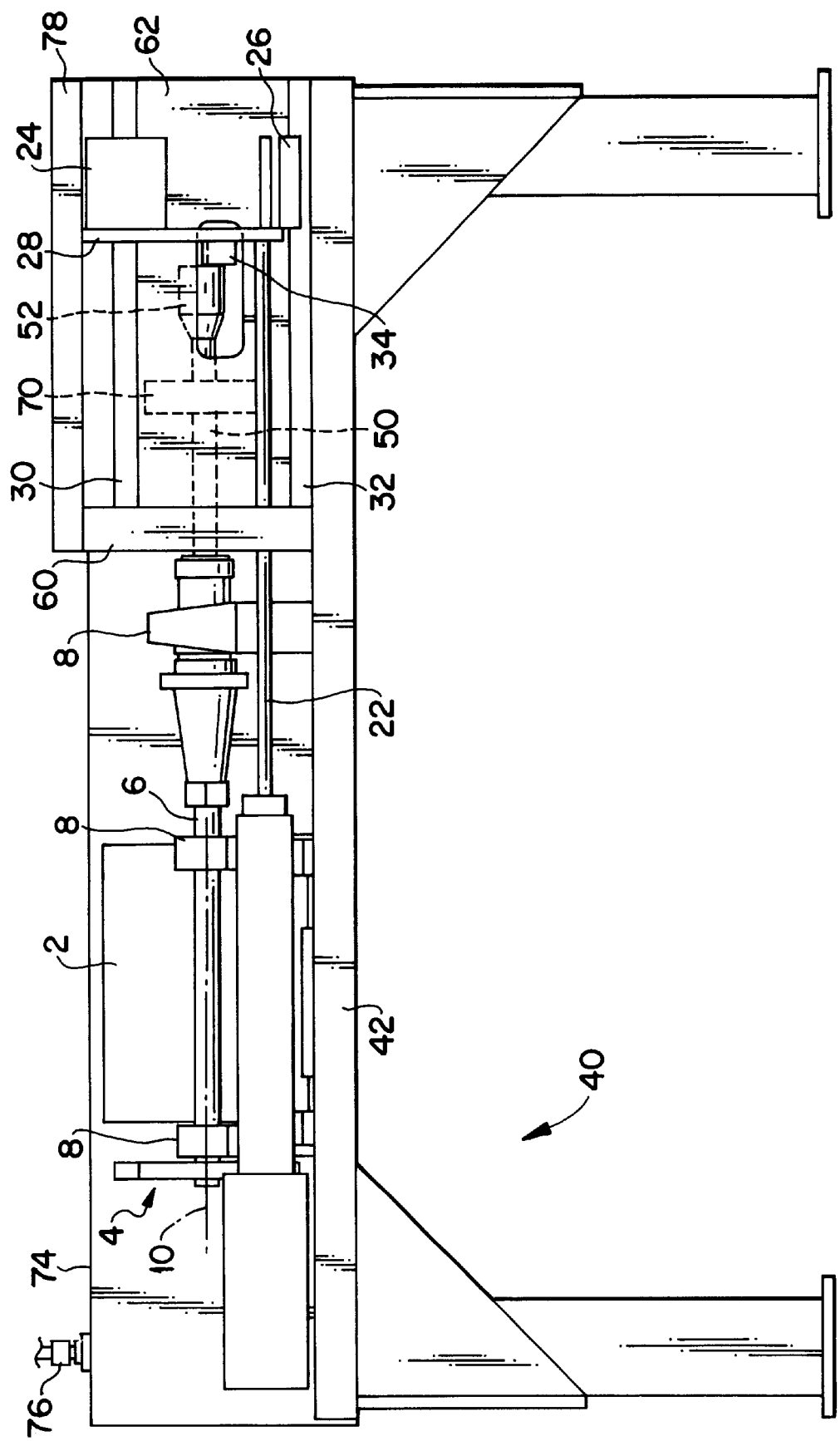
FIG. 2 is a side elevational view of the embodiment shown in FIG. 1.

FIGS. 1 and 2 illustrate one preferred embodiment of machining apparatus according to the invention.

The illustrated apparatus includes a machine, such as a programmable lathe, having a drive motor 2, which may be a variable speed motor, coupled via a gear set 4 to a shaft 6 that is mounted in rotary bearings 8 for rotation about a longitudinal axis 10. Shaft 6 has an output end that is provided with a chuck, or collet, that may preferably be a quick change collet.

The machine further includes a linear actuator 20, which may be driven by a servomotor. Actuator 20 includes a rod 22 having a free end coupled to a cutting tool assembly. The cutting tool assembly includes a support composed of two slide members 24 and 26 and a connecting plate 28 connected between members 24 and 26. Each of members 24 and 26 is guided by a respective one of two stationary, horizontally extending rails 30 and 32. Plate 28 is coupled to rod 22. In addition, plate 28 carries a tool holder 34 which is constructed in a known manner to carry a cutting tool 36.

All of the components described thus far are conventional in the art and are mounted on a work bench, or table, 40 having a table top 42 which directly supports all of the components of the machining apparatus.

Collet 12 is constructed, as is also conventional in the art, to receive and grip an elongate workpiece support member 50, such as an arbor, or shaft, having a free end to which is secured a workpiece 52. If desired, workpiece 52 may be supported on the free end of elongate member 50 via a conical nylon collar 54 that offers a larger connection surface with workpiece 52. According to one common practice in this art, collar 54 may be simply bonded, by any suitable cement, to both the free end of member 50 and to workpiece 52.

In accordance with one feature of the present invention, elongate member 50 is intentionally made of a material which will be easily fractured or disintegrated if workpiece 52 should explode. In addition, it is desirable that elongate member 50 be made of an inexpensive material so that its replacement will not be costly. In accordance with the preferred embodiments of the invention, these results are achieved by making elongate member 50 of wood. Thus, member 50 can be constituted by a commercially available wooden dowel having an appropriate diameter, e.g., 1 inch. In this case, after machining of workpiece 52 has been completed, it can be removed for further machining or use by simply sawing through elongate member 50 or collar 54.

In further accordance with the invention, components 2, 4, 6, 8, 10, 12, 20 and 22 are protected against damage in the event of an explosion by a series of shield elements which are each preferably in the form of steel plates.

These shield elements include at least a first shield element 60 that is interposed between, on the one hand, components 2, 4, 6, 8, 10, and 12, and on the other hand, workpiece 52, and extends along a vertical plane. Shield element 60 is provided with a single opening through which elongate member 50 may be passed in order to be secured to collet 12. Preferably, this opening conforms as closely as possible to the cross section of elongate member 50 and member 50 has a circular cross section.

In further accordance with the invention, table top 42 may also be constituted by a steel plate to which the lower end of shield element 60 is welded.

A second shield element 62 extends along a plane which is orthogonal to both the plane of table top 42 and the main plane of shield element 60 and is interposed between the machining location where workpiece 52 is held and slide members 24 and 26. Element 62 is welded to element 60 and table top 42 and is provided with an elongated opening, as shown in FIG. 2, to permit passage of tool holder 34 and to permit movement of tool holder 34 and tool 36 parallel to axis 10 during a machining operation. Shield element 62 will act to protect rails 30 and 32 and members 24 and 26 against damage in the event of an explosion.

In order to further minimize explosion damage, in further accordance with the invention, tool holder 34 is preferably mounted on connecting plate 28 by means of between two and four shear bolts 66 which extend in a direction perpendicular to the direction in which tool holder 34 extends through the slot in shield element 62. Shear bolts 66 are constructed, in a manner known in the art, so that if an explosion should occur, the resulting shock wave acting on tool 36 and tool holder 34 will cause these bolts to shear at the interface between tool holder 34 and connecting plate 28. As a result, damage to plate 28, slide members 24 and 26 and rails 30 and 32 will be prevented.

It may occur that member 50, because of the material of which it is made, will have a low resistance to bending or breakage in response to machining forces applied by cutting tool 36 to workpiece 52. In order to prevent such deformation of breakage, and improve the resulting machining accuracy, there is further provided, according to the invention, a bearing 70 containing a ball bearing assembly that includes an inner race through which member 50 extends, preferably with a friction fit. In the illustrated embodiment, bearing 70 is securely mounted to shield element 62. However, bearing 70 could also, if desired, be mounted on table top 42.

Figure 3:
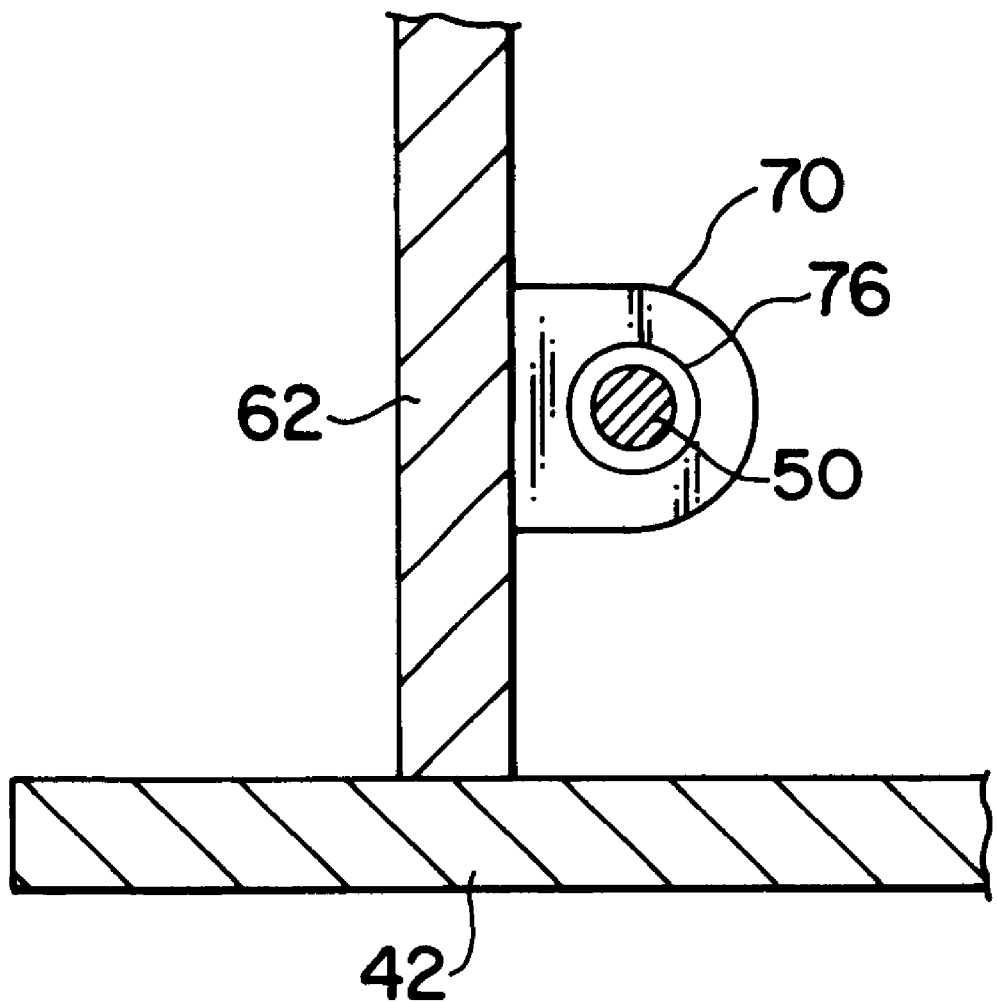
FIG. 3 is a cross-sectional view along line 3—3 of FIG. 1.

FIG. 3 shows the arrangement of bearing 70 and its relation to elongate member 50 in greater detail. This is a partly cross-sectional view taken along the line 3—3 of FIG. 1. As shown, elongate member 50 fits tightly within an inner race 76 of the ball bearing assembly. This allows member 50 to be given an increased length to increase the distance between workpiece 52 and the machine components while stabilizing the rotational movement of workpiece 52. Bearing 70 is secured to shield element 62 by screws which will be sheared in the event of an explosion.

In further accordance with the invention, components 2–12 and 20 are enclosed by a lid 74 that forms, together with an associated portion of table top 40, a housing for those components. Three sides of lid 74 may, as illustrated, be secured to three associated sides of table top 42, while the remaining side of lid 74 is secured to shield element 60. Lid 74 is provided with a coupling 76 for introducing air under pressure into the region enclosed by table top 42, shield element 60 and lid 74. This will establish an over pressure in this region from which air can escape only via small gaps, such as those in shield element 60 around rod 22 and/or elongate member 50. As a result, if workpiece 52 should explode, the resulting explosion debris, which can be in the form of very fine dust particles, will be incapable of entering the enclosure beneath lid 74, due to the remaining over pressure. Therefore, such dust particles will not reach a location where they can damage any bearing surfaces of the drive system.

Finally, according to an optional feature of the invention, there may be provided a third shield element 78. Shield element 78 is shown in broken lines in FIG. 1 and in solid lines in FIG. 2 and preferably extends from the upper edge of shield element 60 in a forward direction to overly slide members 24 and 26, connecting plate 28 and tool holder 34. In addition, shield element 78 lies in a horizontal plane and is secured, as by welding, to the upper horizontal edges of elements 60 and 62.

According to preferred embodiments of the invention, shield elements 60, 62 and 78 and table top 42 may each be a plate made of steel, for example, a mild steel, with a thickness of the order of 2 inches. Both the nature of the steel and the thickness of the plates can be varied to satisfy the requirements associated with the explosive force that would be expected from the particular materials to be machined.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An apparatus for machining a workpiece made of an explosive material, said apparatus comprising:
   a drive system and a cutting tool assembly for cutting a workpiece made of an explosive material, the cutting tool assembly comprising a support, a tool holder mounted on said support, and a cutting tool carried by said tool holder;
   an elongate member carried by, and projecting along an axis from, said drive system for holding the workpiece at a machining location while being rotated about the axis of the drive system;
   a first shield element interposed between said machining location and said drive system for protecting said drive system against damage in the event of explosion of the workpiece; and
   a second shield element interposed between said tool and said support for protecting said support against damage in the event of explosion of the workpiece, said second shield element having an opening through which said tool holder extends,
   wherein said tool holder extends from said support in a first direction transverse to the axis.

2. The apparatus of claim 1 further comprising a table having a table top supporting said drive system and wherein said first shield element is mounted on said table top.

3. The apparatus of claim 2 wherein said first shield element is a first mild steel plate.

4. The apparatus of claim 3 wherein said first plate has a thickness of the order of 2 inches.

5. The apparatus of claim 2 wherein said second shield element is mounted on said table top.

6. The apparatus of claim 5 wherein said second shield element is a second mild steel plate.

7. The apparatus of claim 6 wherein said second plate has a thickness of the order of 2 inches.

8. The apparatus of claim 1 wherein said cutting tool assembly further comprises at least one shear bolt connecting said tool holder to said support.

9. The apparatus of claim 8 wherein said shear bolt extends in a second direction perpendicular to the first direction.

10. The apparatus of claim 1 wherein said second shield element is welded to said first shield element.

11. The apparatus of claim 10 wherein said first shield element, said second shield element and said table top are made of steel and are welded to one another.

12. The apparatus of claim 1 further comprising a third shield element supported by said first and second shield elements and lying in a horizontal plane above said support.

13. The apparatus of claim 12 wherein each of said shield elements and said table top are mild steel plates, and said first and second shield elements are welded to one another, to said table top and to said third shield element.

14. The apparatus of claim 1 wherein said elongate member is made of an easily fracturable material.

15. The apparatus of claim 1 wherein said elongate member is made of wood.

16. The apparatus of claim 14 further comprising a support bearing located between said first shield element and said machining location for supporting said elongate member in order to stabilize the workpiece.

17. The apparatus of claim 1 further comprising:
a cover member enclosing at least a portion of said drive system; and
means for maintaining a higher pressure inside said cover member than outside thereof.

18. An apparatus for machining a workpiece made of an explosive material, said apparatus comprising:
a drive system and a cutting tool assembly for cutting a workpiece made of an explosive material;
an elongate member carried by, and projecting along an axis from, said drive system for holding the workpiece at a machining location while being rotated about the axis of the drive system;
a first shield element interposed between said machining location and said drive system for protecting said drive system against damage in the event of explosion of the workpiece;
a cover member enclosing at least a portion of said drive system; and
means for maintaining a higher pressure inside said cover member than outside thereof.

19. The apparatus of claim 18, wherein said cutting tool assembly comprises a support, a tool holder mounted on said support, and a cutting tool carried by said tool holder, and said apparatus further comprises a second shield element interposed between said tool and said support for protecting said support against damage in the event of explosion of the workpiece.

20. The apparatus of claim 19, wherein said second shield element has an opening through which said tool holder extends.

21. An apparatus for machining a workpiece made of an explosive material, said apparatus comprising:
a drive system and a cutting tool assembly for cutting a workpiece made of an explosive material, the cutting tool assembly comprising a support, a tool holder mounted on said support, and a cutting tool carried by said tool holder;
an elongate member carried by, and projecting along an axis from, said drive system for holding the workpiece at a machining location while being rotated about the axis of the drive system;
a first shield element interposed between said machining location and said drive system for protecting said drive system against damage in the event of explosion of the workpiece; and
a second shield element interposed between said tool and said support for protecting said support against damage in the event of explosion of the workpiece,
wherein said tool holder extends from said support in a first direction transverse to the axis, and
wherein said cutting tool assembly further comprises at least one shear bolt connecting said tool holder to said support.

22. The apparatus of claim 21, further comprising a table having a table top supporting said drive system and wherein said first shield element is mounted on said table top.

23. The apparatus of claim 21, wherein said shear bolt extends in a second direction perpendicular to the first direction.

24. The apparatus of claim 21, wherein said second shield element has an opening through which said tool holder extends.

* * * * *